(12) United States Patent
Blanco Maroto et al.

(10) Patent No.: US 10,717,535 B2
(45) Date of Patent: Jul. 21, 2020

(54) TWO-PHASE TYPE HEAT TRANSFER DEVICE FOR HEAT SOURCES OPERATING AT A WIDE TEMPERATURE RANGE

(71) Applicant: Airbus Defence and Space S.A., Madrid (ES)

(72) Inventors: Ana Belen Blanco Maroto, Madrid (ES); Francisco Jose Redondo Carracedo, Madrid (ES); Alejandro Torres Sepulveda, Madrid (ES); Donatas Mishkinis, Madrid (ES); Juan Martinez Martin, Madrid (ES)

(73) Assignee: Airbus Defence and Space S.A., Madrid (ES)

( * ) Notice: Subject to any disclaimer, the term of this patent is extended or adjusted under 35 U.S.C. 154(b) by 729 days.

(21) Appl. No.: 15/331,232

(22) Filed: Oct. 21, 2016

(65) Prior Publication Data
US 2017/0113804 A1 Apr. 27, 2017

(30) Foreign Application Priority Data
Oct. 21, 2015 (EP) ..................................... 15382517

(51) Int. Cl.
*B64D 15/02* (2006.01)
*F28D 15/06* (2006.01)
(Continued)

(52) U.S. Cl.
CPC ................ *B64D 15/02* (2013.01); *B64C 3/00* (2013.01); *B64D 15/06* (2013.01); *B64D 29/00* (2013.01);
(Continued)

(58) Field of Classification Search
CPC ........ B64D 15/02; B64D 15/06; B64D 29/00; F28D 15/06; F28D 15/0266;
(Continued)

(56) References Cited

U.S. PATENT DOCUMENTS

| 3,831,664 A * | 8/1974 | Pogson | F28D 15/04 |
| | | | 165/80.5 |
| 5,507,150 A * | 4/1996 | Weber | B64D 13/00 |
| | | | 62/100 |
| 5,548,971 A * | 8/1996 | Rockenfeller | F25B 15/02 |
| | | | 62/324.2 |
| 6,938,679 B1 * | 9/2005 | Ito | B64D 47/00 |
| | | | 165/104.21 |

(Continued)

FOREIGN PATENT DOCUMENTS

| DE | 27 24 309 A1 | 11/1978 |
| DE | 41 08 981 A1 | 10/1992 |

(Continued)

OTHER PUBLICATIONS

EP Search Report cited in European Application No. 15382517.9 dated Apr. 6, 2016, eight pages.

*Primary Examiner* — Medhat Badawi
*Assistant Examiner* — Vicente Rodriguez
(74) *Attorney, Agent, or Firm* — Nixon & Vanderhye P.C.

(57) ABSTRACT

A two-phase type heat transfer device (10) for heat sources operating at a wide temperature range. The heat transfer device (10) includes an evaporator (21) collecting heat from a heat source, a condenser (21) providing heat to a cold sink by a first working fluid passing through liquid and vapor transport lines (25, 27) that connect the evaporator (21) and the condenser (23). The evaporator (21) is arranged inside a saddle (31) configured for avoiding that the temperature of the first working fluid in the evaporator (21) is greater than its critical point. The invention also refers to aircraft ice protection systems using the heat transfer device (10).

9 Claims, 4 Drawing Sheets

(51) Int. Cl.
   *B64D 15/06*   (2006.01)
   *B64C 3/00*    (2006.01)
   *B64D 29/00*   (2006.01)
   *F28D 15/02*   (2006.01)
   *F28F 23/00*   (2006.01)
   *F28F 13/00*   (2006.01)
   *F28D 21/00*   (2006.01)

(52) U.S. Cl.
   CPC ......... *F28D 15/0266* (2013.01); *F28D 15/06* (2013.01); *F28D 2021/0021* (2013.01); *F28F 23/00* (2013.01); *F28F 2013/006* (2013.01); *F28F 2013/008* (2013.01)

(58) Field of Classification Search
   CPC ........ F28D 2021/0021; F28F 2013/006; F28F 23/00; F28F 2013/008; F28F 2013/05; F28F 2013/06; F28F 2013/08
   See application file for complete search history.

(56) References Cited

U.S. PATENT DOCUMENTS

| | | | |
|---|---|---|---|
| 7,004,240 | B1 | 2/2006 | Kroliczek et al. |
| 7,882,888 | B1 | 2/2011 | Bubgby et al. |
| 8,550,150 | B2 | 10/2013 | Hou |
| 9,422,063 | B2 * | 8/2016 | Diaz ..................... B64D 33/10 |
| 2011/0113791 | A1 | 5/2011 | Kruglick |
| 2013/0029936 | A1 | 1/2013 | Kim et al. |
| 2014/0116652 | A1 | 5/2014 | Ehinger et al. |

FOREIGN PATENT DOCUMENTS

| | | |
|---|---|---|
| EP | 1884625 | 2/2008 |
| EP | 2 157 391 | 2/2010 |
| EP | 2 567 894 | 3/2013 |
| GB | 2 136 880 | 9/1984 |
| JP | 62-138683 | 6/1987 |

\* cited by examiner

TWO-PHASE TYPE HEAT TRANSFER DEVICE FOR HEAT SOURCES OPERATING AT A WIDE TEMPERATURE RANGE

RELATED APPLICATION

This application claims priority to European Patent Application No. 15382517.9, filed on Oct. 21, 2015, the entirety of which is incorporated by reference.

FIELD OF THE INVENTION

The present invention relates to two-phase heat transfer devices for heat sources operating at a wide temperature range and also to an ice protection system for an aircraft based on a two-phase heat transfer device.

BACKGROUND

The two-phase thermal transport technology consists of transporting heat from a hot source to a cold sink through cyclical evaporation/condensation processes of a working fluid without any external contribution of energy. A heat transfer device based in this technology is also known as a heat transfer device of a Loop Heat Pipe (LHP) type.

Typically, a Loop Heat Pipe includes a working fluid, an evaporator section and a condenser section. The working fluid is vaporized at the evaporator section (due to the heat source extraction). The vapor is received at the condenser section, whereupon the vapor is condensed to form a liquid working fluid. Capillary action returns the condensed working fluid to the evaporator section, thereby completing a cycle.

LHP type heat transfer devices are being used in spacecraft and computers to cool internal devices. The heat generated by the internal devices is absorbed by the evaporator and released at the condenser, thus allowing the temperature of the internal devices to be controlled. Because no mechanically driven parts are used, the heat transfer devices can be stably used for long periods in unmanned spacecraft and computers.

European Patent Application EP 2 157 391 A1 and U.S. Pat. No. 8,550,150 B2 describe LHP type heat transfer devices particularly applicable to computers.

In order to avoid damages to electronic equipment caused by heat cycles due to temperature variations, Variable Conductance Heat Pipes (VCHP) have been proposed with a non-condensable gas in an interior of the heat pipe. The non-condensable gas resides in passages adjacent to the condenser section. As the heat load from a heat source increases or as the evaporator temperature increases, the vapor pressure of the working fluid increases which forces the non-condensable gas to compress and expose more of the condenser area. The dense vapor of the working fluid can then reach the exposed condenser surface for vapor condensation. On the other hand, when the evaporator is at a low temperature, the volume of the non-condensable gas increases, thereby increasing the blocked part of the condenser. The working fluid has a low vapor pressure allowing the component to warm up before the heat is removed. Due to the low vapor pressure, a relatively high volumetric flow rate would be needed to achieve a given amount of heat transfer. This high vapor flow rate can in turn facilitate maintaining the heat source at a relatively constant temperature despite a variation in the heat pipe's operating temperature.

U.S. Patent Application Publication 2013/029936 A1 describes a VCHP including an example for a heat source of a 22° C. to 50° C. temperature range.

Applicants do not know any aircraft ice protection system based on the above mentioned two-phase thermal transport technology.

The ice protection systems used by the aeronautic industry are focused in maintaining the aircraft wet surfaces (mainly leading edges of lifting surfaces, engine air inlets and propeller leading edges) at high temperature to avoid the water accumulation and even to evaporate the water. Different technologies are used for ice protection systems in the aeronautic industry, including:

(i) Hot air systems. These systems have low efficiency (maximum around 40%) because the air must maintain very high temperature to heat the external surfaces.
(ii) Heated blanket systems. They have problems with erosion and electrical power distribution.
(iii) Antifreeze fluid systems based on glycol to protect wings and leading edges of propellers. The main disadvantage is the high quantity of fluid to be stored. These systems are very complicated and they have high energy requirements with a maintenance burden.

Aeronautic ice protection systems using the above mentioned technologies are energy consuming systems.

SUMMARY OF THE INVENTION

In one aspect, the invention provides a two-phase type, such as a loop heat pipe (LHP), heat transfer device comprising: (i) an evaporator collecting heat from a heat source at an operating temperature ranging from T1 (equal or higher than 75° C.) to T2, wherein T2 is above T1, (ii) a condenser providing heat to a cold sink by a first working fluid passing through liquid, and (iii) vapor transport line(s) connecting the evaporator and the condenser. The first working fluid has a critical point $T_{c1}$ higher than T1 and lower than T2, and a freezing point $T_f$ lower than a minimum environmental external temperature T3 expected for the heat transfer device. The first working fluid may be ammonia.

To avoid having the temperature of the first working fluid in the evaporator exceed $T_{c1}$, the evaporator is arranged inside a saddle. The saddle is between the heat source and the evaporator. The saddle provides thermal insulation for the first working fluid in the evaporator with respect to the heat source.

The heat transfer device of the invention is intended for systems having heat sources at high temperatures and demanding environmental conditions. Embodiments of the heat transfer device of the invention are intended for use on aircraft that have sources for high temperatures (T1 to T2), such as the jet or turboprop engines of an aircraft, and where a liquid transport line experiences low external temperatures T3 such as due to high altitude flight.

In an embodiment of the invention, the saddle comprises a cavity filled with a second working fluid having a critical point $T_{c2}$ between T1 and T2, which is the operating temperature range of the heat source. The cavity in the saddle for the second working fluid is between a saddle outer section and a saddle inner section. Both saddle sections are made of a heat conducting material, such as a metal which may be aluminum. The saddle allows the heat transfer device to work in a nominal mode when the operating temperature of the heat source is below the critical temperature of the first working fluid $T_{c1}$ and in a degraded mode when is heat source is hotter than $T_{c1}$. In the degraded mode, the heat transfer between the heat source and the evaporator is reduced as compared to the nominal mode.

In another aspect, the invention provides an ice protection system for aircraft comprising the abovementioned heat transfer device, wherein the heat source is located inside the nacelle of an aircraft engine and the cold sink is an aircraft part subject to ice accretion such as a leading edge of a lifting surface or an engine air inlet. This working fluid of the ice protection system takes the heat dissipated in a heat source and transports it to a cold sink without need for an additional energy contribution.

In another aspect, the invention provides an aircraft comprising a two-phase type heat transfer device wherein the evaporator is located over a heat conducting element of the aircraft and the condenser is located over an aircraft part subject to ice accretion.

BRIEF DESCRIPTION OF THE DRAWINGS

Other characteristics and advantages of the present invention will be clear from the following detailed description of embodiments illustrative of its object in relation to the attached drawings.

DETAILED DESCRIPTION OF THE INVENTION

Figure 1A:
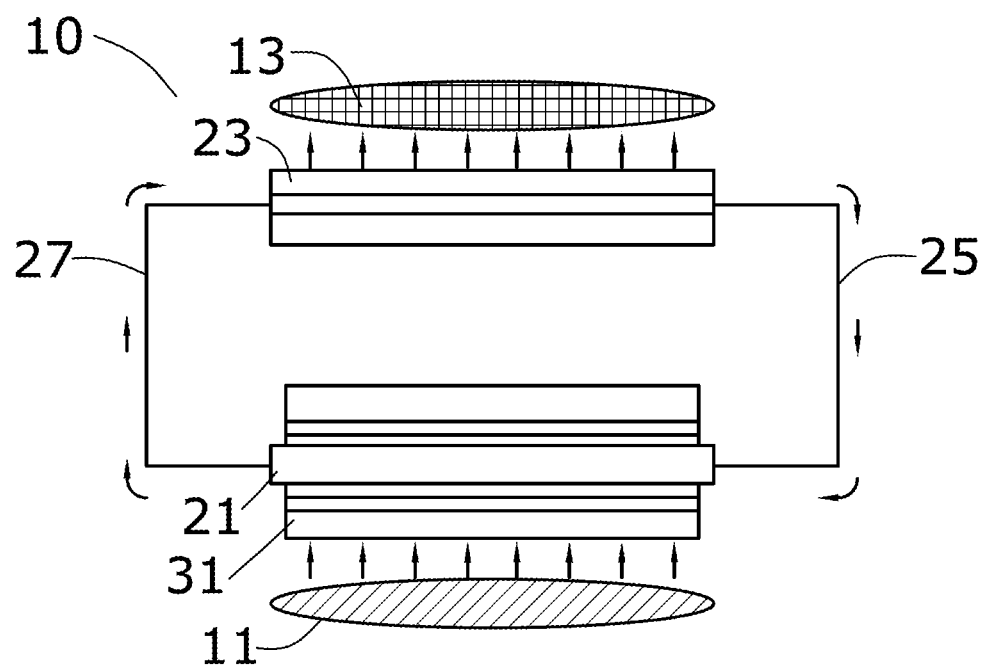
FIG. 1a is schematic diagram illustrating the heat transfer device of the invention.

FIG. 1a shows an embodiment of the invention that includes a two-phase type (or loop heat pipe (LHP) type) heat transfer device 10 which collects heat from a heat source 11 operating in a temperature range (T1 to T2) and provides the collected heat to a cold sink 13. The heat transfer device 10 comprises an evaporator 21 close to the heat source 11, a condenser 23 close to the cold sink 13, and liquid and vapor transport lines 25, 27. The liquid and transport lines allow a first working liquid to circulate between the evaporator and condenser. The evaporator, condenser and liquid and vapor transport lines form a closed loop circulation passage for the first working fluid.

The heat transfer device 10 may be applied as an aircraft ice protection system wherein:
  (i) the heat source 11 is located inside an engine nacelle inlet 40 (FIGS. 3b, 4a and 4b) where the temperature range (T1 to T2) may be 80° C. to 250° C.;
  (ii) the cold sink 13 can be the leading edge of a lifting surface (see wing in FIG. 3a), an engine air inlet or any other part of the aircraft where ice accretion can take place. Each cold sink 13 can have a particular operating temperature;
  (iii) the distance between the heat source 11 and some or all of the cold sinks 13 can be considerable and subjected to low temperatures. Thus, the first working fluid circulating by the liquid transfer line 25. The liquid transfer line may be subjected to environmental temperatures T3 well below 0° C., which corresponds to the freezing of water. T3 may fall as low as minus 35 degrees Celsius. Freezing of the working fluid in the liquid transfer line 25 is to be avoided. Selecting a working fluid that does not freeze at T3 is desired.

Finding a first working fluid is not practical that can work in a temperature range of 80° C. to 250° C., and avoid freezing in the liquid transfer line 25 which may be subjected to temperatures T3 well below 0° C., such as minus 35° C. To overcome the impracticability of a single first working fluid, an embodiment of the invention uses two working fluids and a saddle structure.

The disclosed embodiment of the invention includes:
  (i) a first working fluid having a critical point $T_{c1}$ higher than T1 (such as 80° C.) and below T2 (such as 250° C.), and having a freezing point $T_f$ that meets the requirements of the installation of the heat transfer device 10. The freezing point $T_f$ of the first working fluid is below the environmental temperature T3 of the liquid transfer line 25. A suitable first working fluid is ammonia that has a critical point $T_{c1}$ at or above 130° C. and a freezing point $T_f$ at or below minus 40° C.
  (ii) an evaporator 21 arranged inside a saddle 31 configured to avoid the temperature of the first working fluid in the evaporator 21 to go above the critical temperature $T_{c1}$ of the first working fluid. That means that the temperature of the contact surface of the saddle 31 with the evaporator 21 should always be in the range T1 to $T_{c1}$.

Figure 1B:
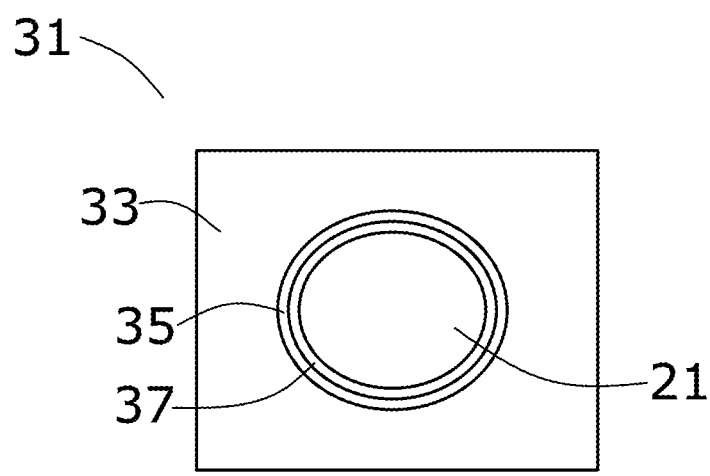
FIG. 1b is a schematic cross sectional view of the evaporator arrangement.

In the embodiment illustrated in FIGS. 1a and 1b, the saddle 31 comprises a cavity 35 between outer and inner saddle sections 33, 37 made of a heat conducting material such as aluminum or other metal. The cavity 35 is filled with a second working fluid having a critical point $T_{c2}$ lower or equal to $T_{c1}$. The critical point $T_{c2}$ of the second working fluid is given by its saturation curve. The density inside the cavity 35 is constant so that the fraction evolves (with the density saturation values of the liquid and vapor phases) in order to maintain this value constant.

The cavity 35 is configured, e.g., designed, to account for the pressure of the second working fluid in the supercritical region which is highly dependent of the charged density. A suitable second working fluid is ammonia.

Figure 2A:
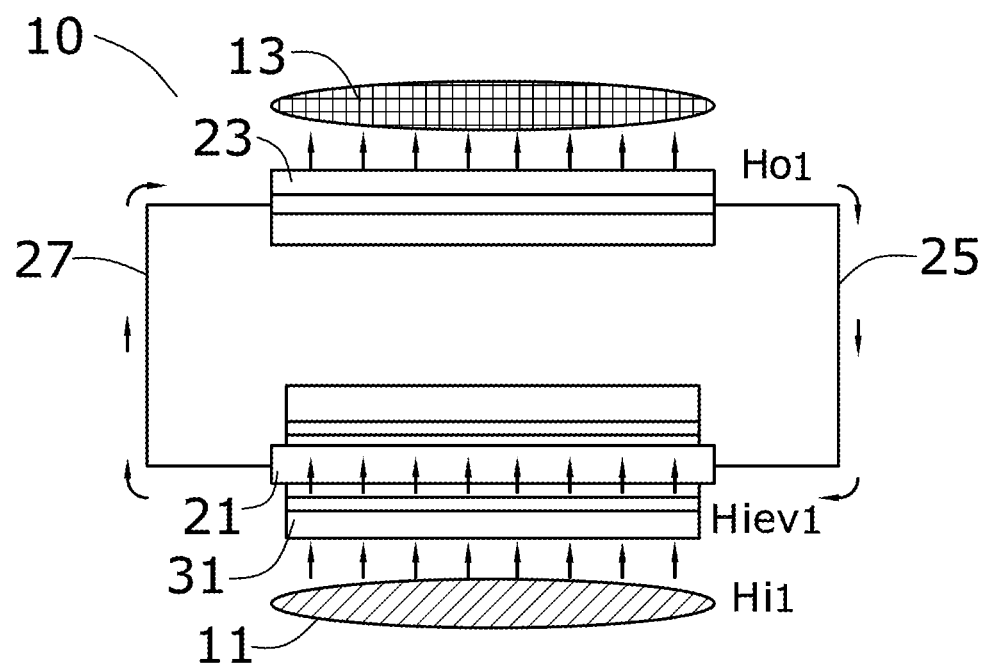
FIG. 2a is a schematic diagram illustrating the operation of the heat transfer device in a nominal mode.
Figure 2B:
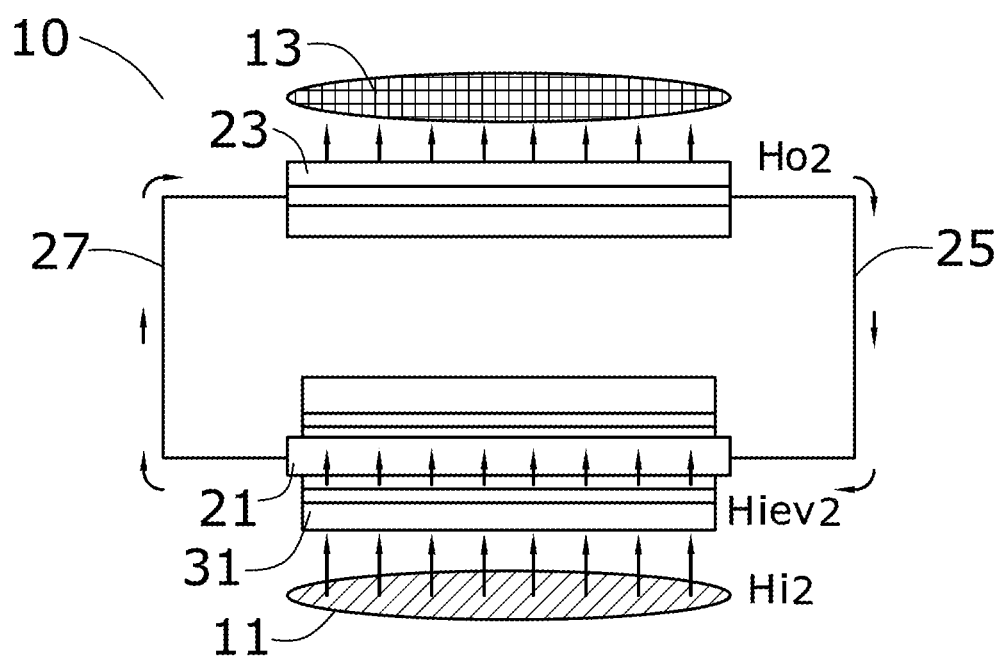
FIG. 2b is a schematic diagram illustrating the operation of the heat transfer device in a degraded mode.

The cavity 35 changes the thermal coupling between the heat source 11 and the evaporator 21 and works in two modes (nominal and degraded modes) depending on the temperature of the heat source 11:
  (i) The nominal mode occurs while the temperature of the heat source 11 is below the critical point $_{c2}$ of the second working fluid. As illustrated in FIG. 2a, the heat input $H_{iev1}$ at the evaporator 21 is proportional to the heat input $H_{i1}$ at the external surface of the saddle 31. Also, the heat output $H_{o1}$ at the condenser 23 is proportional to the heat input $H_{iev1}$ at the evaporator 21 (for illustration purposes the arrows indicating $H_{i1}$, $H_{iev1}$ and $H_{o1}$ are represented with similar dimensions).
  (ii) The degraded mode occurs while the temperature of the heat source 11 is above the critical point $T_{c2}$ of the second working fluid. The degraded mode relies on the second working fluid having a low thermal conductance in a gaseous state. As illustrated in FIG. 2b the heat input $H_{iev2}$ at the evaporator 21 is less than the heat input $H_{i2}$ at the external surface of the saddle 31. During degraded mode, the heat transfer from the heat source to the evaporator is reduced due to the saddle and the gaseous state of the second working fluid in the cavity of the saddle.

Figure 3A:
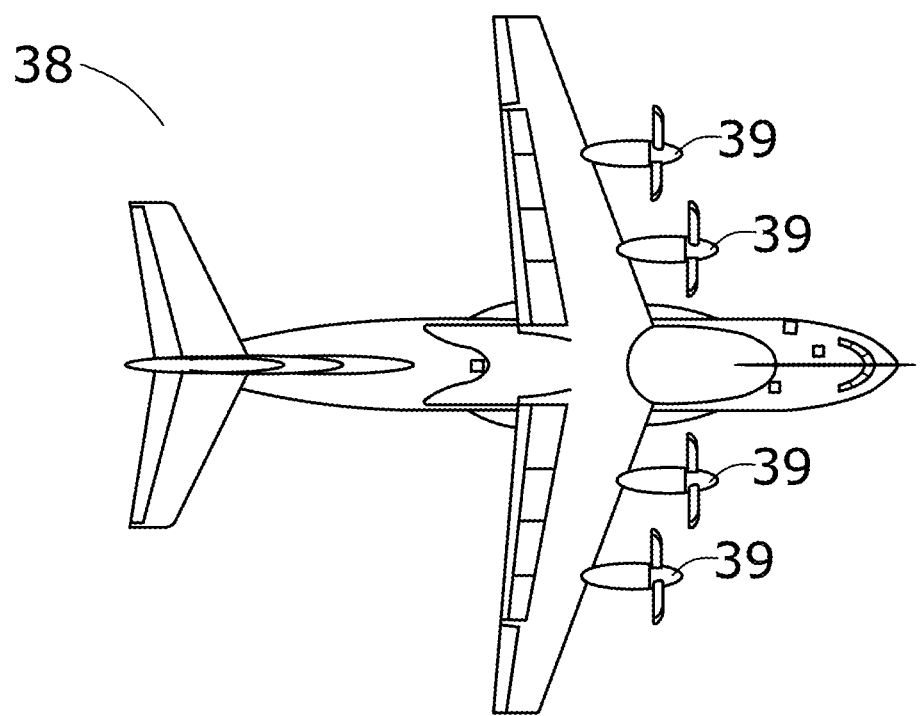
FIG. 3a is a top view of an aircraft with four engines.
Figure 3B:
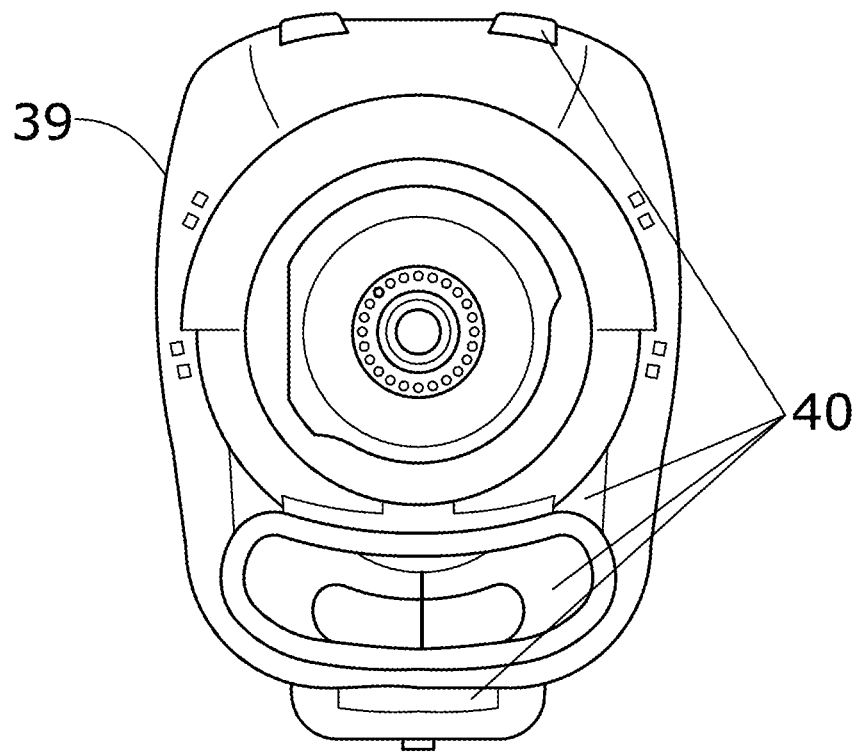
FIG. 3b is a perspective view of an aircraft engine illustrating the air inlets that can be protected against ice accretion by means of a heat transfer device according to the invention.

An ice protection system for an engine 39 of an aircraft 38 may comprise one or more heat transfer devices 10 for the engine air inlets 40 (see FIGS. 3a and 3b).

Figure 4A:
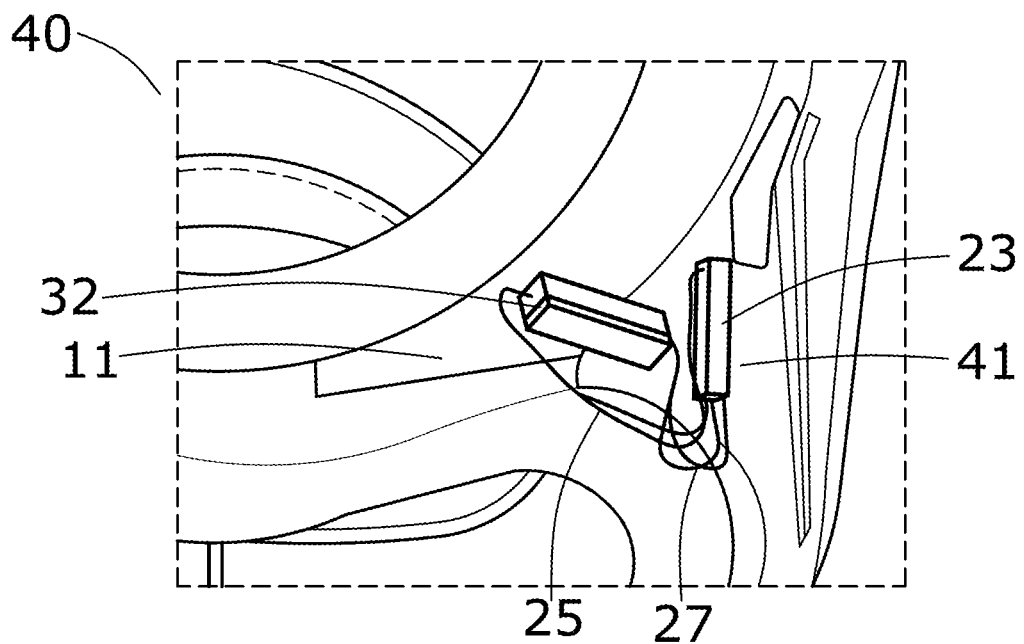
FIG. 4a is a schematic view of an embodiment of an ice protection system of an air inlet of an aircraft engine.
Figure 4B:
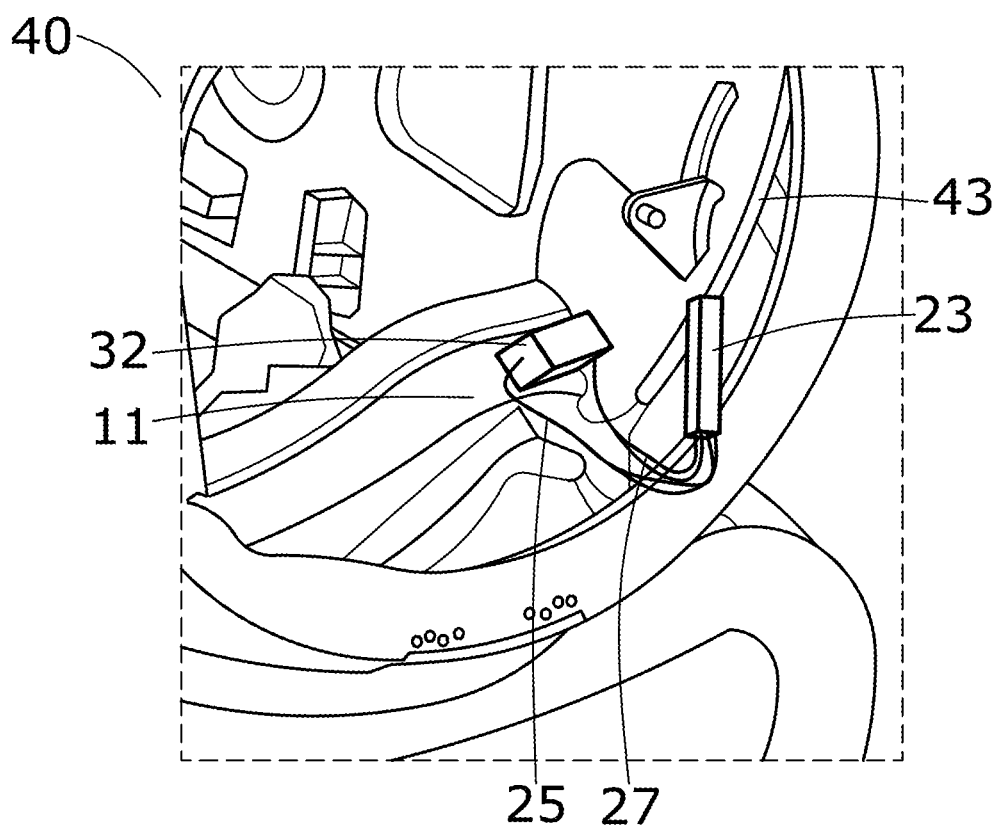
FIG. 4b is a schematic view of another embodiment of an ice protection system of another air inlet of an aircraft engine.

As shown in FIGS. 4a and 4b an evaporator assembly 32 (comprising an evaporator arranged inside a saddle as explained above) is located over a heat source 11 of the aircraft engine 39 and the condenser 23 is located over a cold sink. The evaporator assembly 32 and the condenser 23 are connected by liquid and vapor lines 25, 27.

In the embodiment shown in FIG. 4a, the condenser 23 is located over a heat conducting element 43 which is arranged to transmit heat to a specific area of the air inlet 40.

In the embodiment shown in FIG. 4b, the condenser 23 is located over a lip 41 of the air inlet 40.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention is:

1. A method for operating a two-phase type heat transfer device comprising:
    collecting heat from a heat source by a first working fluid flowing through an evaporator, wherein the heat source operates in a temperature range of T1 to T2, wherein T1 is at least 75° C.;
    transferring the collected heat to a cold sink by the first working fluid flowing through a condenser;
    circulating the first working fluid between the evaporator and the condenser using a liquid transport line and a vapor transport line, wherein the evaporator, the condenser and the liquid and vapor transport lines form a closed loop circulation passage for the first working fluid;
    modulating the temperature of the first working fluid in the evaporator by a second working fluid in a cavity of a saddle, wherein the saddle includes an outer saddle section separated and thermally isolated by the cavity from an inner saddle section that houses the evaporator, the outer saddle section is adjacent and in thermal contact with the heat source, and the outer saddle section and the cavity are is-between the heat source and the evaporator,
    wherein the modulation includes the second working fluid in a liquid phase while the heat source is operating at a temperature no greater than a critical point temperature of the first working fluid and the second working fluid is in a vapor phase while the heat source is operating at a temperature greater than the critical point temperature than the first working fluid.

2. The method of claim 1 wherein the first and second working fluids are ammonia.

3. The method of claim 1 wherein the cold sink is a leading edge of an aerodynamic lifting surface of an aircraft or of an engine nacelle of the aircraft.

4. The method of claim 1 wherein the heat source is a jet engine or a turboprop engine of an aircraft.

5. The method of claim 1 wherein a critical point temperature of the second working fluid is equal to or less than the critical point temperature of the first working fluid, and the critical point temperature of the second working fluid is greater than temperature T1.

6. The method of claim 1 wherein the liquid transport line is subjected to an environmental temperature of at or below minus 35 degrees Celsius.

7. The method of claim 1 wherein the transfer of heat to the cold sink suppresses ice accumulation on a surface of the cold sink.

8. The method of claim 7 wherein the surface of the cold sink is a leading edge of a wing or other lifting surface of an aircraft or a leading edge of an engine nacelle of the aircraft.

9. A method operating a heat transfer device comprising:
    transferring heat from a heat source into an outer saddle section of a saddle, through a second working fluid in a cavity in the saddle and into to a first working fluid flowing through an evaporator housed in an inner saddle section of the saddle, wherein the inner saddle section and the evaporator are thermally isolated from the outer saddle section and the heat source by the second working fluid in the cavity;
    circulating the first working fluid in a closed loop circulation passage including the evaporator, a condenser, a liquid transport line and a vapor transport line; and
    modulating heat transfer from the heat source into the first working fluid in the evaporator by maintaining as a liquid the second working fluid in the cavity while a temperature in the cavity is no higher than a critical point temperature of the first working fluid and vaporizing the second working fluid in the cavity in response to the temperature in the cavity rising to at least the critical point temperature of the first working fluid.

* * * * *